United States Patent
Kumashikar et al.

(10) Patent No.: US 12,487,658 B2
(45) Date of Patent: Dec. 2, 2025

(54) WORKLOAD-DEPENDENT INTEGRATED CIRCUIT OPERATION BASED ON POWER HEADROOM

(71) Applicant: Intel Corporation, Santa Clara, CA (US)

(72) Inventors: Mahesh K. Kumashikar, Bangalore (IN); Ankireddy Nalamalpu, Portland, OR (US); Mahesh A. Iyer, Fremont, CA (US); Atul Maheshwari, Portland, OR (US); Yuet Li, Fremont, CA (US); Md Altaf Hossain, Portland, OR (US)

(73) Assignee: Altera Corporation, San Jose, CA (US)

( * ) Notice: Subject to any disclaimer, the term of this patent is extended or adjusted under 35 U.S.C. 154(b) by 827 days.

(21) Appl. No.: 17/559,632

(22) Filed: Dec. 22, 2021

(65) Prior Publication Data

US 2022/0113788 A1    Apr. 14, 2022

(51) Int. Cl.
 *G06F 1/3287* (2019.01)
 *G06F 1/324* (2019.01)
 *G06F 30/343* (2020.01)

(52) U.S. Cl.
 CPC .......... *G06F 1/3287* (2013.01); *G06F 1/324* (2013.01); *G06F 30/343* (2020.01)

(58) Field of Classification Search
 CPC ....... G06F 30/343; G06F 1/3287; G06F 1/324
 See application file for complete search history.

(56) References Cited

U.S. PATENT DOCUMENTS

| | | | |
|---|---|---|---|
| 9,753,470 B1* | 9/2017 | Hawley | G05F 1/462 |
| 10,635,159 B2* | 4/2020 | Kolla | G06F 1/3287 |
| 11,886,275 B2* | 1/2024 | Lyakhov | G06F 1/28 |
| 2008/0082844 A1* | 4/2008 | Ghiasi | G06F 1/3203 |
| | | | 713/323 |
| 2017/0083031 A1* | 3/2017 | Atallah | G05F 1/56 |
| 2019/0043737 A1 | 2/2019 | Hutton | |
| 2019/0107881 A1 | 4/2019 | Powley | |

OTHER PUBLICATIONS

European Search Report for Application No. 22207192.0 mailed Apr. 26, 2023, 7 pages.

* cited by examiner

*Primary Examiner* — Raymond N Phan
(74) *Attorney, Agent, or Firm* — Fletcher Yoder, P.C.

(57) ABSTRACT

The present disclosure describes programmable logic that may be operated in a turbo processing mode to cause an ongoing operation to be completed faster than a scheduled completion time. With at least some of the remaining time to the scheduled completion time, power savings may be realized by operating the programmable logic into a deep sleep mode, where configuration memory associated with the programmable logic may be set to a suitable voltage level as to not cause data loss at lower or zero voltage levels but otherwise realize power savings relative to an amount of power consumed during average processing operations.

20 Claims, 6 Drawing Sheets

WORKLOAD-DEPENDENT INTEGRATED CIRCUIT OPERATION BASED ON POWER HEADROOM

BACKGROUND

The present disclosure relates generally to integrated circuit (IC) devices, such as programmable logic devices (PLDs). More particularly, the present disclosure describes power headroom monitoring systems and methods that enable integrated circuit device operation to be scaled up or down based on the power headroom available.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices may be utilized for a variety of purposes or applications, such as digital signal processing and machine learning. Indeed, machine learning and artificial intelligence applications have become ever more prevalent. Programmable logic devices (PLDs) may perform many of these functions. It may be desired for a programmable logic device (PLD) to operate using reduced amounts of power. Some integrated circuit devices, such as central processing units (CPUs), can operate in turbo mode. When a CPU is currently drawing less than the thermal design power (TDP), a CPU may increase its voltage and frequency to consume the additional power headroom. A CPU has a system design that is fixed at manufacturing and therefore when to enter turbo mode may be relatively predictable in advance. The system design that is programmed into a programmable logic device, such as a field programmable gate array (FPGA), however, it is not known at the time of manufacturing. Therefore, it is not known at the time of manufacturing how the PLD will behave in operation.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
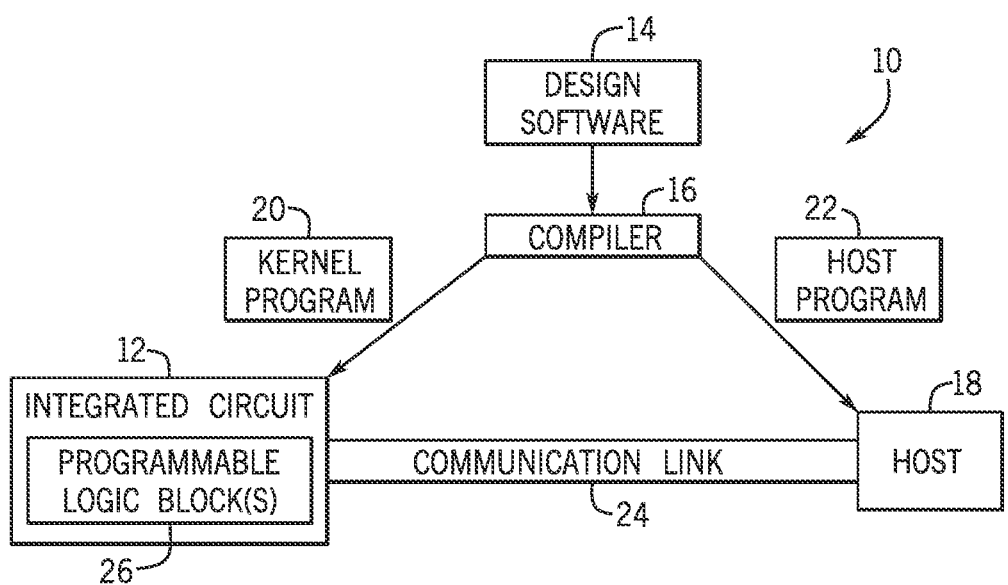
FIG. 1 is a block diagram of a system that may adjust its operation to accommodate power headroom and save power, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As processing applications have become ever more prevalent, there is a growing desire for circuitry to perform complex calculations that may use large amounts of power. Processing applications may be implemented in programmable logic of a programmable logic device (PLD), like a field programmable gate array (FPGA). Increasingly, it may be desired for PLDs to become more efficient and consume less power.

The PLD described herein may take advantage of variable frequencies and voltages to reduce its power consumption overall. The PLD may operate in a low power mode until determining that there is power headroom between its present power consumption amount and a target power consumption amount. When there is power headroom, the PLD may operate into a turbo processing mode. While in the turbo processing mode, the PLD may complete processing operations quickly such that the processing operations are completed prior to a time of scheduled completion. When the processing operations are completed, some or all of the PLD may be operated into a deep sleep mode. By rushing to complete the processing operations prior to the time of scheduled completion then sleeping until at least the time of scheduled completion, the PLD may consume reduced amounts of power relative to if no turbo processing mode or sleep mode had been used.

To enter the turbo processing mode, a frequency used by the PLD to perform the processing operations may be increased. A faster frequency may be obtained by increasing a frequency of a clocking signal used by the PLD to perform the processing operations. In some embodiments, a voltage used by the PLD may be increased in addition to or instead of the variable frequency to enter the turbo processing mode. To enter the sleep mode, one or more portions of the PLD may be disconnected from a local power supply and/or external power supply. The PLD may be power gated or powered off while in the sleep mode.

In some embodiments, the PLD may operate in a normal processing mode until determining that there is power headroom. Power headroom represents the difference between the present power consumption of the PLD and a second power consumption level representing an upper limit. The second power consumption level may be any suitable threshold level, such as a thermal design power (TDP) or a maximum level according to product specifications. The second power consumption level may change over time (e.g., as temperature increases or decreases, the second power consumption level may decrease or increase correspondingly) or may be static. When there is sufficient power headroom, the PLD may operate in a turbo processing mode that consumes more power and causes the PLD to operate faster. The PLD or a host device associated with the PLD may identify there is sufficient power headroom based on when the present power headroom is greater than a threshold value. The PLD may exit the turbo mode once pending tasks or computations have been completed. At this point, the PLD may enter a lower-power mode (e.g., deep sleep mode) that consumes less power. This may allow the PLD to save power overall.

With this in mind, FIG. 1 illustrates a block diagram of a system 10 that may accommodate power headroom and save power by doing so. A designer may desire to implement functionality, such as the power headroom utilization operations of this disclosure, on an integrated circuit 12 (such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit 12 without specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit 12.

The designers may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit 12. The host 18 may be a computing device (e.g., a host device). The host 18 may receive a host program 22 which may be implemented by the kernel programs 20. To implement the host program 22, the host 18 may communicate instructions from the host program 22 to the integrated circuit 12 via a communications link 24, which may be, for example, direct memory access (DMA) communications or peripheral component interconnect express (PCIe) communications. In some embodiments, the kernel programs 20 and the host 18 may enable configuration of programmable logic 26 on the integrated circuit 12. The programmable logic 26 may include circuitry to implement, for example, operations to perform matrix-matrix or matrix-vector multiplication for AI or non-AI data processing. The integrated circuit 12 may include many (e.g., hundreds, thousands, millions of) logic cells that define the programmable logic 26. Additionally, the programmable logic 26 may be communicatively coupled to one another such that data outputted from one portion of the programmable logic 26 may be provided to other portions of the programmable logic 26.

In some embodiments, the designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Further, it should be understood that the integrated circuit 12 may be any other suitable type of integrated circuit device (e.g., an application-specific integrated circuit and/or application-specific standard product). As shown, the integrated circuit 12 may have input/output circuitry for driving signals off device and for receiving signals from other devices via input/output pins. Interconnection resources, such as global and local vertical and horizontal conductive lines and buses, may be used to route signals on integrated circuit 12. Additionally, interconnection resources may include fixed interconnects (conductive lines) and programmable interconnects (e.g., programmable connections between respective fixed interconnects). Programmable logic 26 may include combinational and sequential logic circuitry. For example, programmable logic 26 may include look-up tables, registers, and multiplexers. The programmable logic 26 may include combinatorial or sequential logic circuitry arranged in logic array blocks (LABs) or configurable logic blocks (CLBs). In various embodiments, the programmable logic 26 may be configured to perform a custom logic function. The programmable interconnects associated with interconnection resources may be considered to be a part of the programmable logic 26.

Programmable logic devices (PLDs), such as integrated circuit 12, may contain programmable elements (e.g., logic cells, logic blocks) within the programmable logic 26. For example, as discussed above, a designer (e.g., a customer) may program (e.g., configure) the programmable logic 26 to perform one or more desired functions. By way of example, some programmable logic devices may be programmed by configuring their programmable elements using mask programming arrangements, which is performed during semiconductor manufacturing. Other programmable logic devices are configured after semiconductor fabrication operations have been completed, such as by using electrical programming or laser programming to program their programmable elements. In general, programmable elements may be based on any suitable programmable technology, such as fuses, antifuses, electrically-programmable read-only-memory technology, random-access memory cells, mask-programmed elements, and so forth.

Many PLDs are electrically programmed. With electrical programming arrangements, the programmable elements may be formed from one or more memory cells. For example, during programming, configuration data is loaded into the memory cells using pins, input/output circuitry, and the like. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 26. CRAM cells may be located within the footprint of the programmable logic 26 or outside the footprint in a dedicated configuration memory. For instance, in some embodiments, the output signals may be applied to the gates of metal-oxide-semiconductor (MOS) transistors within the programmable logic 26.

Keeping the foregoing in mind, the programmable logic 26 discussed here may be used for a variety of applications and to perform many different operations associated with the applications, such as multiplication and addition. The programmable logic 26 may perform operations temporarily at relatively fast rate while the integrated circuit 12 is operated in a turbo processing mode when there is a suitable amount of power headroom, as will be appreciated.

Figure 2:
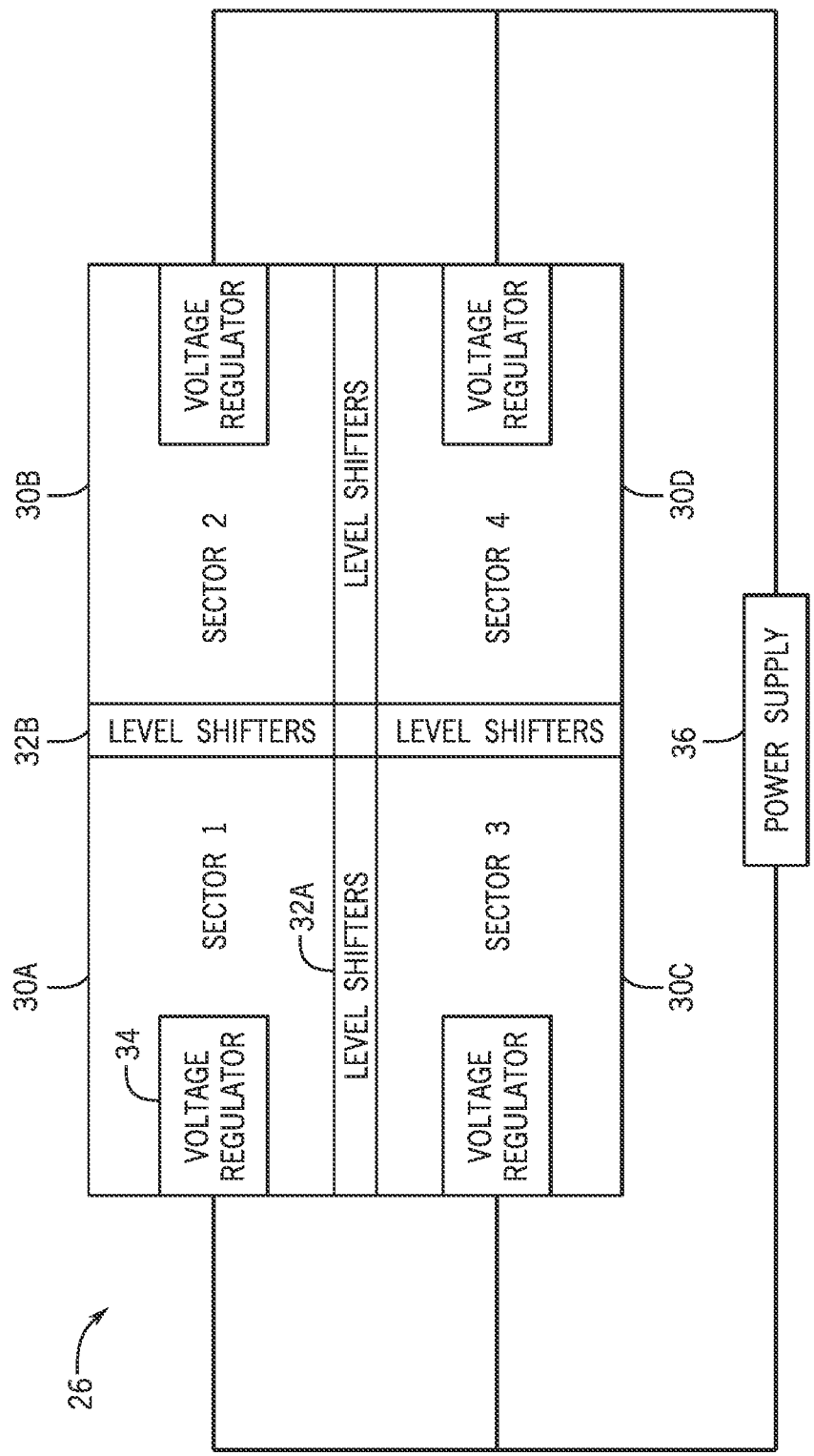
FIG. 2 is a block diagram of the integrated circuit device of FIG. 1, in accordance with an embodiment of the present disclosure.

Turning now to a more detailed discussion of the integrated circuit 12, FIG. 2 is a diagram of the programmable logic 26 of FIG. 1 depicting programmable logic sectors of the fabric connected to a single power supply. The programmable logic 26 may be divided into sectors 30A, 30B, 30C, 30D. For example, the programmable logic 26 may be divided into a first sector 30A, a second sector 30B, a third sector 30C, and a fourth sector 30D. The sectors 30A, 30B, 30C, 30D of the programmable logic 26 may be separated from one another by horizontally arranged level shifters 32A and vertically arranged level shifters 32B. The level shifters 32 may provide a voltage level lower than a maximum or default voltage level of the programmable logic 26 to at least one of the sectors 30A, 30B, 30C, 30D during operation. The level shifters 32 may enable each of the sectors 30A, 30B, 30C, 30D to establish an independent power domain within the programmable logic 26. For example, the level shifters 32 may enable the first sector 30A operating at a first voltage to communicate with the second sector 30B that may be operating at a second voltage higher than the first voltage. The level shifters 32 may include isolation circuitry to isolate voltage levels of one sector 30 from another sector 30. The isolation circuitry may be omitted between neighboring sectors (e.g., third sector 30C is a neighbor to first sector 30A and fourth sector 30D) if its known that neighboring sectors 30 are to be operated at a same voltage level (e.g., with a threshold difference of voltage between the different sectors 30)

Additionally, each sector 30A, 30B, 30C, 30D may be connected to an independent voltage regulator 34 and a power supply 36. Each sector 30A, 30B, 30C, 30D may run via connections to the same power supply 36. The power supply 36 may provide power control for each of the sectors 30A, 30B, 30C, 30D. The level shifters 32 may be located on all the fabric wires between each of the sectors 30A, 30B, 30C, 30D, and may separate each of the sectors 30A, 30B, 30C, 30D.

Each of the sectors 30A, 30B, 30C, 30D may include a sector control component that may receive control signals from the programmable logic device software (e.g., Intel® Quartus® by INTEL CORPORATION). The programmable logic device software may designate voltage levels of the multiple voltage domains corresponding to each sector 30A, 30B, 30C, 30D of the programmable logic 26. Each sector 30A, 30B, 30C, 30D may receive the designated voltage level, and utilize the voltage regulator 34 corresponding to the sector 30A, 30B, 30C, 30D to regulate the voltage level of the sector 30A, 30B, 30C, 30D. The programmable logic fabric software may assign voltage levels based on logic assigned to run on each of the sectors 30A, 30B, 30C, 30D. For example, the programmable logic fabric software may assign a higher voltage to the first sector 30A and lower voltage to the second sector 30B. In this manner, the programmable logic fabric may utilize power per the sectors 30A, 30B, 30C, 30D as needed, rather than supplying the entire programmable logic 26 with relatively high power for a present power consumption of the programmable logic 26. Selective voltage supply systems and methods may be used with power headroom monitoring systems and methods to enable selective sector-based acceleration of operations. Thus, any of the sectors 30 (e.g., the sector 30A) may be operated into a turbo processing mode while one or more of the remaining sectors 30 (e.g., sectors 30B, 30C, 30D) are operated into respective a deep sleep mode and/or a normal processing mode. In some cases, the deep sleep mode may involve reducing power to other portions of the integrated circuit (e.g., PLD) in addition to one or more sectors, for example certain input/output circuitry or level shifters may have power removed or reduced to save overall device power.

Figure 3:
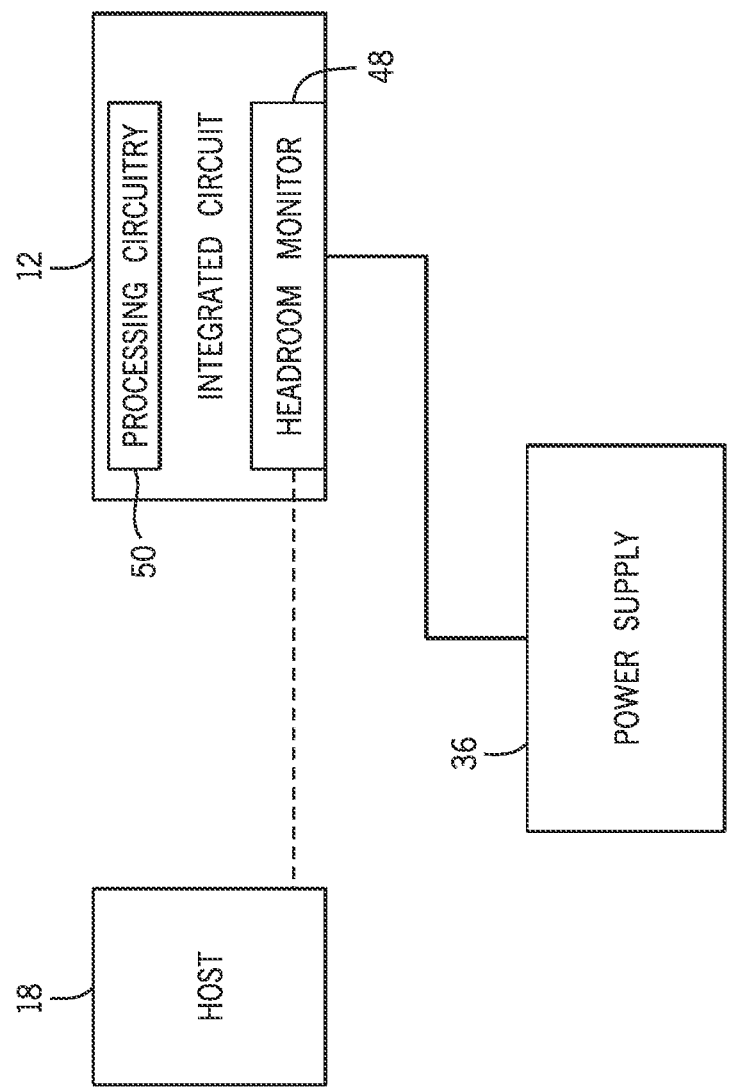
FIG. 3 is a block diagram of the system of FIG. 1 being used to monitor power consumption of the integrated circuit, in accordance with an embodiment of the present disclosure.

FIG. 3 is a block diagram of part of the system 10 being operated in a turbo processing mode and/or a deep sleep mode. The integrated circuit 12 may include a power headroom monitor 48. The power headroom monitor 48 may sense power received from the power supply 36, power consumed by the integrated circuit 12, voltage received from the power supply 36, current received from the power supply 36, frequency of an input signal, or the like. As the integrated circuit 12 receives signals from the power supply 36, the power headroom monitor 48 may sense a value and/or a characteristic of the signal and indicate the sensed value and/or sensed characteristic to the host 18. The power headroom monitor 48 may detect a present temperature of the integrated circuit 12 via thermal sensors. In some cases, the power headroom monitor 48 and/or the host 18 may perform historical data logging of the sensed data and/or characteristics to monitor performance over time.

The host 18 may gather various data from the power headroom monitor 48. The data may include voltage data, current data, power data, frequency data, temperature data, or the like. Process data may be used to predict power headroom. The host 18 and/or other processing circuitry, like processing circuitry of the integrated circuit 12, may receive and use the data to track power headroom of the integrated circuit 12. For example, the host 18 may use the data to generate plots and/or to analyze data similar to the plot of FIG. 4.

Figure 4:
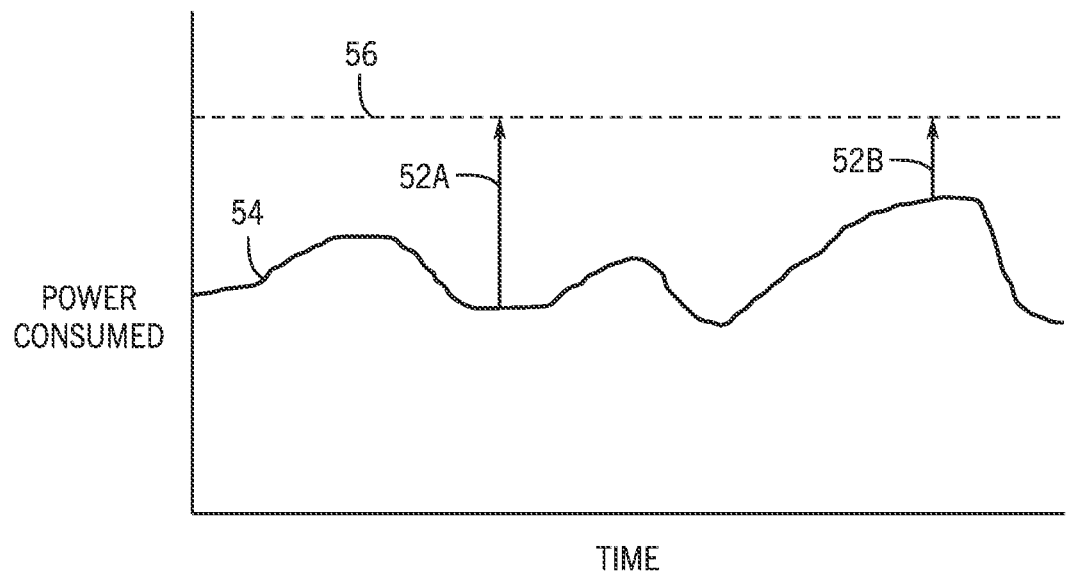
FIG. 4 is a plot comparing target power consumption and power consumption over time to illustrate power headroom, in accordance with an embodiment of the present disclosure.

FIG. 4 is a plot comparing target power consumption and power consumption over time to illustrate power headroom 52. The power headroom 52 may be the difference between a target power value and an actual power value at a given time (e.g., difference between an actual and target power consumption). The target power consumption is represented via line 56. The actual power consumption over time is represented via line 54. Over time, the power headroom 52 changes as the differences between the target power consumption and the actual power consumption change. For example, power headroom 52A is greater than power headroom 52B as the actual power consumption changes over time. Programmable logic devices (e.g., FPGAs) may reduce power consumption by variably adjusting frequency or a bitstream used in response to a value of the power headroom 52. For example, since the power headroom 52 represents a difference between a target or maximum power permitted to be consumed by the integrated circuit 12 and an actual power consumption, power headroom 52 may be used to increase operational rates for a period of time (e.g., until the operations are done or power headroom is zero or a negative value). When ongoing operations of the integrated circuit 12 complete at the faster rate, the integrated circuit 12 may sleep for the remainder of the scheduled time for completing the operations, enabling a power savings.

Figure 5:
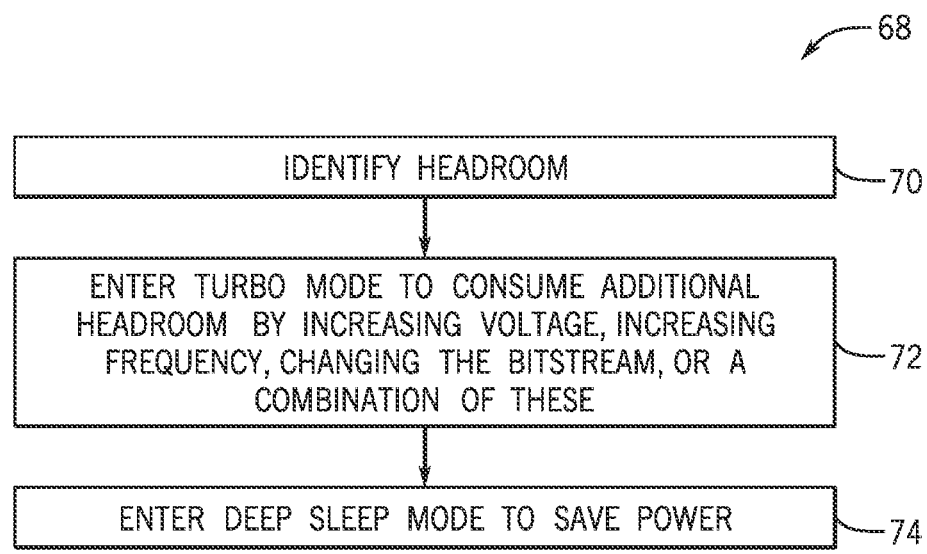
FIG. 5 is a flow chart of a process to accommodate power headroom and save power, in accordance with an embodiment of the present disclosure.

FIG. 5 is a flow chart of a process 68 to accommodate power headroom and save power. Generally the process 68 includes identifying power headroom ("headroom") (block 70), entering a turbo processing mode ("turbo mode") to consume additional power headroom (block 72), and entering a deep sleep mode to save power (block 74). In some embodiments, the process 68 may be implemented at least in part by executing instructions stored in a tangible, non-transitory, computer-readable medium, such as memory of the host 18, the compiler 16, the integrated circuit 12, or the like, using processing circuitry, such as the host 18, the compiler 16, the integrated circuit 12, or the like. Here, the process 68 is described as being performed by processing circuitry, such as the host 18, the integrated circuit 12, or the like, but it should be understood that any suitable processing circuitry may similarly perform these operations.

At block 70, the processing circuitry 50 may identity power headroom 52. Identifying power headroom 52 may include receiving sensed data from the power headroom monitor 48 (e.g., monitoring circuit) and determining the power headroom 52 based on the sensed data. The power headroom 52 may be identified based on data sensed by the power headroom monitor 48 of FIG. 3. One or more sensing operations may be used to obtain a suitable amount of data to determine the power headroom 52. The power headroom monitor 48 may sense a voltage and/or a current drawn by the integrated circuit 12 from the power supply 36. Sometimes temperature data may be used as an indicator of relative power consumption or may be used to predict when a particular power headroom is expected to be present. The power headroom monitor 48 may determine a power consumed at a time of sensing based on a known resistance value, the voltage drawn, and/or the current drawn. To determine the power headroom 52, the processing circuitry 50 may determine a difference in value between a present power consumption level and a target power consumption level. The processing circuitry 50 may access or receive the sensed data from the power headroom monitor 48.

At block 72, the processing circuitry 50 may enter the turbo processing mode to consume additional power by increasing frequency of the integrated circuit 12, changing the bitstream loaded into programmable logic 26, or both. One or more of the sectors 30 may be operated into the turbo processing mode. The integrated circuit 12 may store the different bitstreams. In some cases, the processing circuitry 50 may enter the turbo processing mode in response to the power headroom 52 crossing or being greater than or equal to a threshold level of power headroom. Sometimes turbo processing mode may not be entered until the power headroom 52 has been sustained for a defined duration of time, which may reduce a likelihood of entering a turbo processing mode for a power headroom 52 sustained for a short amount of time as opposed to the power headroom 52 being sustained for a long or otherwise suitable amount of time.

In some cases, turbo processing mode is entered in response to determining to recompile a bitstream used to program at least a portion of the programmable logic 26, subsequently recompiling the bitstream, and programming the programmable logic 26 with the recompiled bitstream. In other cases, bitstream are initially compiled for different modes of operation, which may include different frequencies that could be used for the turbo processing mode, to generate a bitstream to use to cause the integrated circuit 12 to enter the turbo processing mode without recompiling based on the power headroom.

At block 74, the processing circuitry 50 may enter the deep sleep mode to save power. The deep sleep mode may be entered from the turbo processing mode after the computations are completed. One or more of the sectors 30 may be operated from the turbo processing mode to the deep sleep mode. In some cases, the power headroom monitor 48 may determine when the computations are completed by monitoring input pads and/or output pads of the programmable logic 26 to determine when data stops communication to or from the programmable logic 26. The power headroom monitor 48 may determine when the computations are completed by monitoring current received by the programmable logic 26, where when the current used reduces the amount of current received from the power supply 36 may reduce. In some cases, the deep sleep mode may involve decoupling the power supply 36 from one or more portions of the integrated circuit 12. Some embodiments may define trigger events that the processing circuitry 50 may monitor for and, once identified, respond by exiting the turbo processing mode. One trigger event may include the processing circuitry 50 determining that the operation previously being performed using the turbo processing mode has completed. To do so, the processing circuitry 50 may determine when the programmable logic 26 is idle or consuming less voltage and/or current.

In some cases, a trigger event may cause the processing circuitry 50 to operate the programmable logic to exit the turbo processing mode to return to a normal processing mode or to the deep sleep mode. An example of the trigger event may include the processing circuitry 50 identifying when a present power headroom has crossed a target power level or is less than a threshold amount of power headroom, which may indicate that the integrated circuit 12 is consuming more power than desired or that the integrated circuit 12 has stopped performing some processing operations (e.g., power being consumed reduced). When the operation to be completed in turbo processing mode is still ongoing, the processing circuitry 50 may operate the programmable logic 26 to return to a normal processing mode. In some embodiments, the processing circuitry 50 may predict future power headroom and/or future power consumption expected while in the turbo processing mode and may not enter the turbo processing mode when the future power headroom is expected to be less than a power headroom threshold value or future power consumption is expected to be larger than a power threshold value. To detect the trigger event, the processing circuitry 50 may, while already operating the programmable logic 26 in the turbo processing mode, operate the power headroom monitor 48 to sense a power value indicative of turbo processing mode power consumption (e.g., an additional power value to the power used to originally determine the power headroom 52) and may determine a power headroom value based on a difference between a threshold power value and the power value (e.g., an additional power headroom than the original power headroom value used to trigger entering into the turbo processing mode). The processing circuitry 50 may determine that the power headroom value is greater than a threshold power headroom value, which may indicate that at least some of the programmable logic 26 is idle or has stopped performing an operation while in the turbo processing mode.

Referring back to block 72, changing the bitstream to enter the turbo processing mode may involve changing bitstreams among bitstreams designed for different frequency values or for performing different combinations of operations. For example, additional operations may be performed when there is additional power headroom to be consumed.

Figure 6:
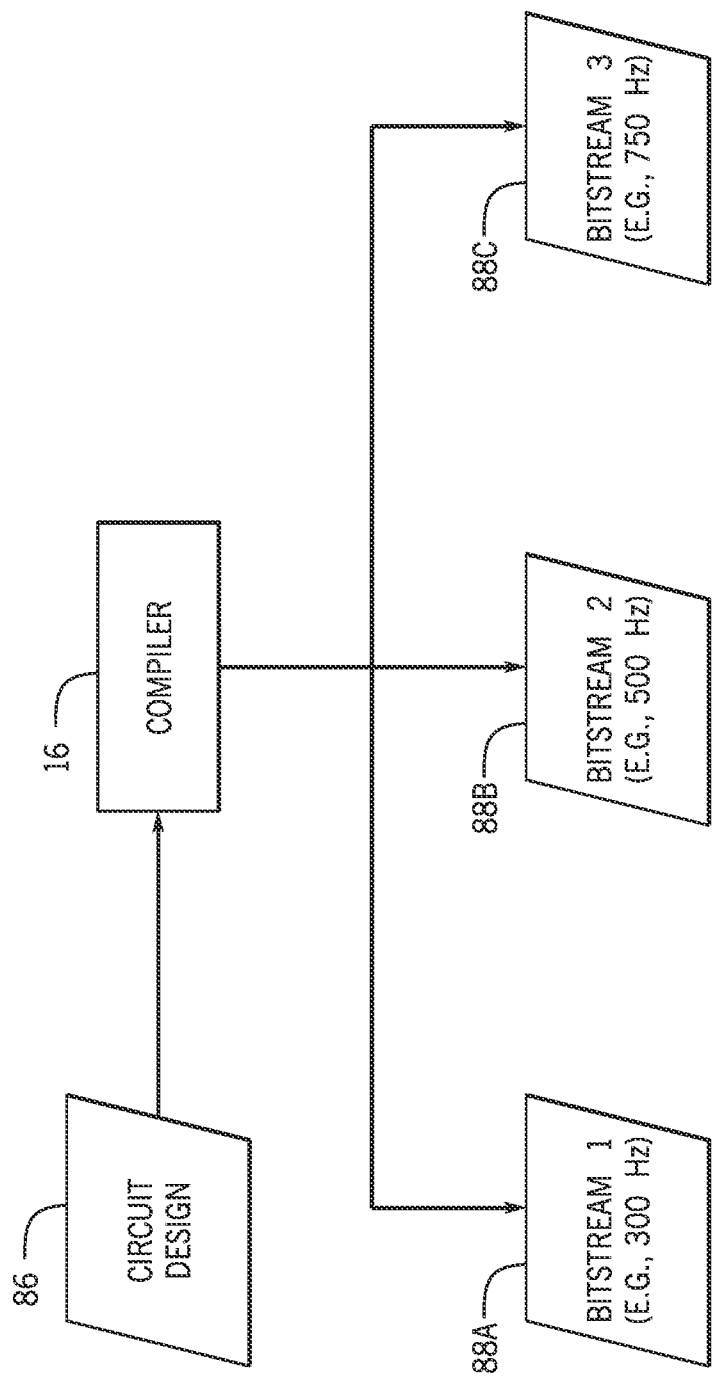
FIG. 6 is a block diagram showing the system of FIG. 1 generating multiple bitstreams for different versions of a circuit design that can corresponding to different frequencies used during the operations of FIG. 5, in accordance with an embodiment of the present disclosure.

Bitstreams that are generated for different frequency values are shown in FIG. 6. FIG. 6 is a block diagram of the system 10, such as the compiler 16, generating one or more bitstreams to be operated at different frequencies. A circuit design 86 may be designed to perform one or more operations. The compiler 16 may generate one or more versions of the circuit design as the different bitstreams 88. The one or more versions may correspond to optimizations made in placement and routing of the circuit design 86 for operation at different clocking frequencies. The different bitstreams may be used with the power headroom utilization operations of process 68 of FIG. 5 to switch the integrated circuit 12 in and out of the turbo processing mode and/or a normal processing mode. It is noted that partial bitstreams may be used to replace a sector-worth of implemented logic designs as opposed to an entire bitstream. The process used to do so may be referred to as a "partial reconfiguration" since a partial portion of the programmable logic 26 is reconfigured. The partial bitstream may be considered a partial configuration file.

When generating the bitstreams 88, the compiler 16 may use optimizations such as LUT rotations, wire LUT insertions, and/or node duplication to improve the placement and/or routing associated with the circuit design 86 at a specific frequency, such as to reduce timing to complete an operation. In some cases, different versions of optimizations for a same frequency may be compared to identify a relatively more suitable option among the different versions. Once the compiler 16 identifies the version for that frequency, a bitstream corresponding to that version is finalized and output for future reference when time to operate the integrated circuit 12 into a different operational mode. For example, when operating the integrated circuit 12 from a normal processing mode (e.g., a first operational mode) into a turbo processing mode (e.g., a second operational mode), the host 18 may send the bitstream 88B to the integrated circuit 12 to trigger programming of the faster clocking bitstream. In some cases, the integrated circuit 12 may operate itself into the turbo processing mode and may have onboard control circuitry to load the bitstream 88B into its configuration memory to trigger reprogramming of one or more portions of the programmable logic 26 based on the bitstream 88B. The host 18 may instruct the integrated circuit 12 to load the bitstream 88B. The integrated circuit 12, in some systems, may determine via the power headroom monitor 48 to load the bitstream 88B. And, in some cases, the host 18 may transmit the bitstream 88B to the integrated circuit 12 to trigger the change between processing modes without the integrated circuit 12 processing data generated by the power headroom monitor 48.

When generating the bitstreams 88, the compiler 16 may perform synthesis operations, placement operations, routing operations, and a final timing analysis. Additional or different operations may be performed to generate the bitstreams 88. The synthesis operations involve optimizing and mapping a register-transfer level (RTL) design to programmable logic primitives. The placement and routing operations may correspond to fitting operations. Indeed, the placement and routing operations may include periphery placement to place peripheral circuitry and devices and analytic placement to determine whether to place remaining circuits. When placement is complete, a physical synthesis may be performed, followed by clock allocation. When allocating the clock, the compiler 16 may assign the differing clock frequencies amongst the different bitstream 88 generation operations. Other operations performed may include physical clustering, placement legalization and detailed placement refinement to verify and correspondingly adjust the placements based on timing analysis or synthesis outcomes. Once any adjustments are completed, physical synthesis may be repeated and routing performed (e.g., global circuit routing, clock routing, detailed connection routing). Final adjustments may be made using global timing analysis (e.g., global retiming) and physical synthesis may be repeated. After the last physical synthesis completes, a final timing analysis may be performed to obtain final performance metrics to use to evaluate versions of bitstreams, to program other components of the integrated circuit 12.

The operations of the placement and routing operations (e.g., fitting operations) consider and optimize incrementally to improve timing, congestion, wiring usage, and utilization. During these optimizations, the compiler 16 may evolve a critical path and, in this process, may better assign critical logic to relatively high frequency regions and non-critical logic to relatively low frequency regions. The timing models used during these optimizations account for the different frequencies or voltages in the different modes to be used by the integrated circuit.

The different bitstreams 88 may correspond to a same circuit design to perform a same circuit operation at different clocking frequencies. As an example, bitstream 88A may, when loaded into a configuration memory, cause at least a portion of the programmable logic 26 to implement a first circuit design and the bitstream 88B may cause at least a portion of the programmable logic 26 to implement a second circuit design to perform a same processing operation as the first circuit design but with relatively greater frequencies. Sometimes, one of the bitstreams 88 may cause the programmable logic 26 to implement the circuit design 86 at a faster clocking frequency and/or a faster rate through another method than another bitstream 88 causes the programmable logic to implement the circuit design 86. Indeed, the turbo processing mode may involve loading a replacement bitstream 88 configured to implement a same operation as an original bitstream 88 but at a greater clocking rate than that of the original bitstream 88.

A frequency used by a respective sector while in a turbo processing mode may be workload-dependent and/or sector-specific. In this way, frequencies used in the turbo processing mode may change between operations performed at different times by the same sector, may change between operations performed at different times by the different sectors, or may change between different sectors performing simultaneous operations. A frequency may be changed to enter the turbo processing mode without also changing the voltage, such as in cases where a power signature is desired to remain the same even while in the turbo processing mode.

Figure 7:
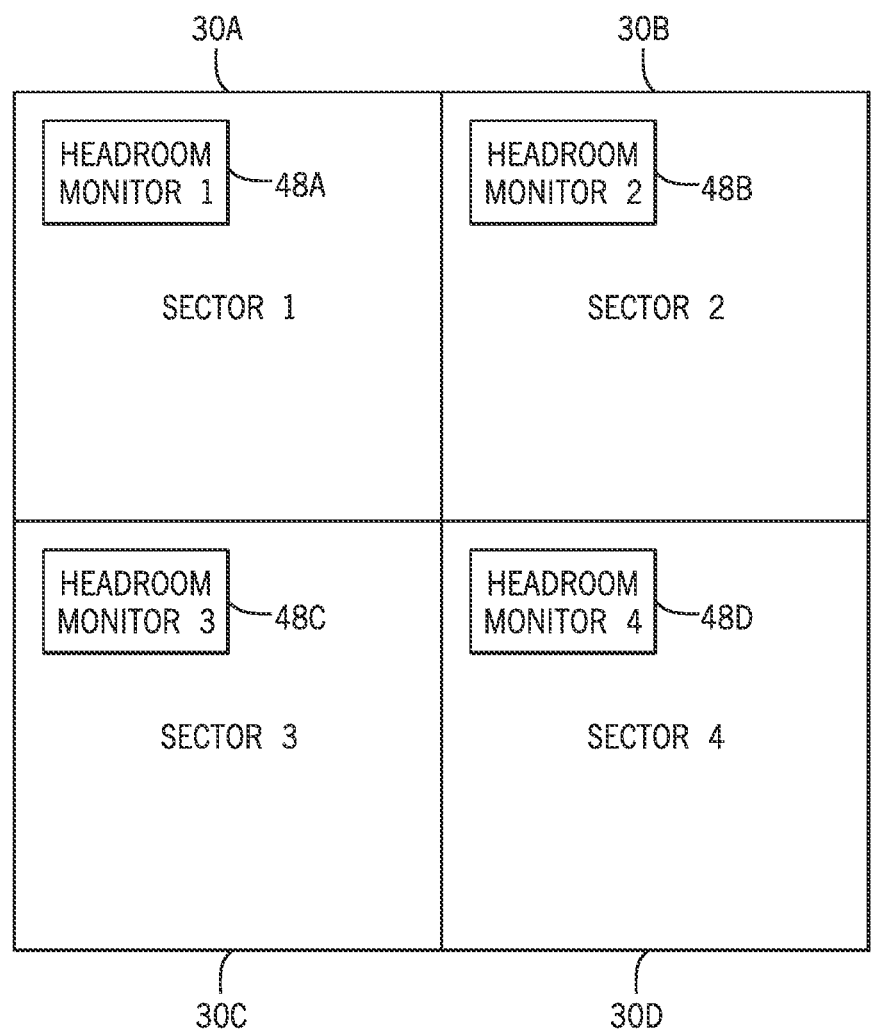
FIG. 7 is a block diagram of the integrated circuit of FIG. 2 showing an example programmable logic fabric where each sector include a respective power headroom monitor, in accordance with an embodiment of the present disclosure.

Similar to the flexibility in which of the system 10 stores and triggers loading of the respective bitstreams 88, these systems and methods may be flexibly applied to different regions of programmable logic, referred to as sectors. To elaborate, FIG. 7 is a block diagram of the integrated circuit 12 showing an example programmable logic 26 having different sectors 30. Here, each sector 30 includes a respective power headroom monitor 48 (48A, 48B, 48C, 48D).

The sectors 30 may be of same or different dimensions. Similarly, the sectors 30 may take any geometric dimension, including polygons, circles, squares, or the like. Each sector 30 includes an independent portion of programmable logic that may be collectively operate with other portions of the programmable logic 26 or individually operate without interaction with data signals of the other portions of the programmable logic 26. The sectors 30 may include isolation circuitry that enables reprogramming of the programmable logic 26 within the sector 30 to occur without interrupting other processing operations ongoing in other regions of the programmable logic 26.

Each sector 30 may include its own power headroom monitor 48 circuit. Similar to the power headroom monitor 48, the power headroom monitor 48 may sense a current supplied, a power supplied, a voltage supplied, or other parameters to evaluate when the sector 30. The power headroom monitor 48 may include sensing circuitry to perform such measurements, such as a current sensor, a voltage sensor, a current amplifier, or the like. The respective power headroom monitors 48 may enable the respective control of the different sectors 30. These systems and methods may permit any of the sectors 30 to be operated in any of the turbo processing mode, deep sleep mode, and normal processing mode in parallel to any of the other sectors 30 being operated in any of the modes. For example, sector 30A may be operated in the turbo processing mode at a different time than the sector 30B operating in the turbo processing mode. Similarly, the sector 30A may be operated into the deep sleep mode at the same time as the sector 30B.

The sectors 30 may be reconfigured separately or together based on whether the integrated circuit 12 is performing a full reconfiguration or a partial reconfiguration. When performing a full reconfiguration, the bitstream 88 received corresponds to a logic implementation to be used to reconfigure all the programmable logic 26. However, when performing a partial reconfiguration, the bitstream 88 received corresponds to a logic implementation to be used to reconfigure one or more sectors 30 of the programmable logic 26—where resulting operations may span sector boundaries (e.g., operations may use data or signals generated in other sectors 30 that the one performing the operation).

In some embodiments, the host 18 may monitor performance of the integrated circuit 12, such as timing and consumption levels of operations implemented via the programmable logic 26. The host 18 and/or the processing circuitry 50 may predict when the integrated circuit 12 is expected to have power headroom 52 (e.g., a power headroom value) between its target and present power consumption levels based on data indicative of the monitored performances. The host 18 or the processing circuitry 50 may operate components of the programmable logic 26 to preemptively enter into the turbo processing mode to maximize time spent in the turbo processing mode. For example, the programmable logic may include one or more of the power headroom monitors 48 to log power consumption over time. The host 18 device may receive this logged data and use the logged data to identify time periods where the integrated circuit had the power headroom 52 and/or to identify data patterns that indicate a period of power headroom 52 to be consumed (e.g., indicators that resource consumption is to be relatively low).

The examples described herein may be used in combination with a power headroom threshold. For example, the integrated circuit 12 may be operated into the turbo processing mode in response to the identified power headroom 52 being greater than a threshold amount. Thresholding may also be used with returning to a normal mode. For example, the integrated circuit 12 may be operated from a turbo processing mode into a normal processing mode when the present power headroom 52 (e.g., at a time after entering the turbo processing mode) is less than a threshold amount. This may involve the integrated circuit 12 perform two power headroom calculations—a first calculation that may be used to enter turbo processing mode and a second calculation that may be used to return to the normal processing mode. The integrated circuit 12 may use thresholding with the deep sleep mode. However, the deep sleep mode may be implemented as a mode that is automatically entered after completing a first processing operation in the turbo processing mode but before receiving a second processing operation.

Furthermore, the sectors 30 may use respective thresholds and respective processing operations. For example, a first power consumption amount for a first sector 30 may be compared to a first threshold while a second power consumption amount for a second sector 30 may be compared to a second threshold, where the first threshold and the second threshold are different values. Using respective and optionally different thresholds for different sectors may further reduce power consumption and tailor operation of the integrated circuit 12 to the specific application by enabling different processing operations to be variably and respectively controlled and powered. For example, an operation performed via programmable logic of a first sector 30 that runs at a higher baseline operating temperature than programmable logic of a second sector 30 performing a second operation may be operated to use different thresholds. The different thresholds may be tailored to reduce a likelihood or prevent the integrated circuit 12 from exceeding a maximum operating temperature at the different sectors 30. Indeed, the first sector 30 may use a lower threshold than the second sector 30 since the first sector 30 may have a greater baseline temperature Similar sector-specific thresholding may be done relative to operating noise levels of the different sectors 30, such as if a portion of the integrated circuit has greater amounts of signal noise, it may be desired to operate these sectors 30 at a lower maximum power level or lower frequency in turbo processing mode relative to a less noisy sector 30 as to not further aggravate noise levels.

As described herein, programmable logic devices (PLDs) may benefit from the use of power headroom to determine when to accelerate operations. Indeed, a PLD (e.g., processing circuitry of the PLD) may sense a first power value associated with its programmable logic and may determine a power headroom value based on a difference between a threshold power value and the first power value. The threshold power value may be a thermal design power (TDP) value specified during manufacturing, according to manufacturer specification, or another suitable method. Other processing circuitry described herein may have a thermal design power similar to the PLD. The thermal design power may be stored as an indication retrievable by the PLD when performing these operations. The thermal design power may sometimes be stored as indications in fuses or in memory. When stored in reprogrammable fuses or memory, the value of thermal design power indication may change responsive to actual device performances and/or historical device performances. For example, as the PLD ages, a tolerance of the system to higher operating temperatures may reduce and it may be desired to reduce a stored value for the thermal design power. The PLD may determine to operate the programmable logic to enter a turbo processing mode based on the power headroom value, such as when the power headroom value (e.g., difference between the thermal design power and the present power consumption level) is greater than or equal to a threshold value of headroom. The threshold value of headroom may be of suitable value to tolerate an increase in power consumption corresponding to the accelerated operations to be performed in the turbo processing mode. In some cases, an amount by which the power headroom exceeds the threshold value of headroom is used to determine by how much to accelerate operations. A power consumption to operation acceleration relationship may be referenced and/or additional thresholds may be used. For example, multiple thresholds may be used to determine which difference is to trigger which accelerations (e.g., a relatively smaller acceleration may be used when the power headroom merely exceeded a lowest threshold). Thus, the PLD may identity which of several bitstreams to implement in the programmable logic to operate the programmable logic into the turbo processing mode (e.g., to accelerate its ongoing operations). In some cases, before entering the turbo processing mode, the PLD may implement a custom logic function associated with a first clock frequency in a first region of configurable logic blocks (CLBs) of the programmable logic based on a first bitstream stored in configuration memory associated with the programmable logic. The PLD may operate the programmable logic to enter the turbo processing mode at least in part by receiving a second bitstream and writing the second bitstream to the configuration memory to cause the programmable to enter the turbo processing mode. The first region of configurable logic blocks (CLBs) may implement the custom logic function associated with a second clock frequency based on the second bitstream after the second bitstream is stored in the configuration memory.

Technical effects of the present disclosure include using a turbo processing mode with programmable logic to flexibly consume additional power when a present amount of power headroom permits. By using programmable logic-based methods, adjustments to ongoing processing operations based on a present headroom may be made on a per-workload basis. This may mean that an adjustment made to one or more portions of the programmable logic is based on the ongoing workload being processed, including the frequency and/or voltage by which to use to processing workload, or the like. Moreover, power adjustments may be made on a per-sector basis rather than over the whole integrated circuit, enabling tailored approaches to processing acceleration while in the turbo processing mode.

Systems and methods to do so may include power headroom monitoring circuitry included in one or more portions of the programmable logic. The power headroom monitoring circuitry may sense an ongoing power consumption and compare the power consumption levels to a target power consumption level to identify whether power headroom is present. When a suitable amount of power headroom is present, the programmable logic (e.g., the integrated circuit) may be operated into a turbo processing mode to intentionally force the implemented circuitry to consume additional power and perform an ongoing operation relatively faster. With the extra time remaining after completing the ongoing operation faster than originally scheduled, the integrated circuit may then at least partially enter a deep sleep mode where at least the programmable logic voltage levels are lowered to a retention voltage threshold. Different bitstreams may be used to change the amount of power headroom at any given time. In some cases, a clock frequency or a voltage supply may be boosted while the integrated circuit is in the turbo processing mode. These systems and methods may reduce power consumed by the integrated circuit. For example, lower energy consumption at a given computation capability is able to be based on an actual customer consumed power. In some cases, a 10% power headroom may enable 4-5% energy savings. Indeed, these systems and methods may create premium, lower energy consuming devices based on operating the integrated circuit responsive to an actual, real-time power profile from process distribution perspective.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

EXAMPLE EMBODIMENT 1. A system comprising: an integrated circuit comprising programmable logic configurable to perform a first workload and a monitoring circuit; and a host device configured to: receive sensed data from the monitoring circuit while the integrated circuit performs the first workload; determine power headroom based on the sensed data; and determine to cause the integrated circuit to enter a turbo processing mode based on the power headroom.

EXAMPLE EMBODIMENT 2. The system of example embodiment 1, wherein the host device is configured to perform a workload-dependent partial reconfiguration of the integrated circuit based on the power headroom of the integrated circuit to perform the first workload in the turbo processing mode.

EXAMPLE EMBODIMENT 3. The system of example embodiment 1, wherein the host device is configured to: determine that a processing operation was completed by the integrated circuit while in the turbo processing mode; and instruct the integrated circuit to enter a deep sleep mode based on the processing operation being completed.

EXAMPLE EMBODIMENT 4. The system of example embodiment 1, wherein the host device is configured to determine the power headroom based on a difference between a first power consumption and a target power consumption.

EXAMPLE EMBODIMENT 5. The system of example embodiment 1, wherein the integrated circuit is configured to perform a processing operation based on a configuration memory of the integrated circuit, and wherein the configuration memory is configured to store a first bitstream.

EXAMPLE EMBODIMENT 6. The system of example embodiment 5, wherein the integrated circuit is configured to enter the turbo processing mode at least in part by: receiving a second bitstream; and writing the second bitstream to the configuration memory to enter the turbo processing mode.

EXAMPLE EMBODIMENT 7. The system of example embodiment 6, wherein the second bitstream causes a programmable logic to implement a circuit design at a faster clocking frequency than the first bitstream causes the programmable logic to implement the circuit design.

EXAMPLE EMBODIMENT 8. The system of example embodiment 1, wherein the first bitstream is configured to cause a programmable logic to implement a first circuit design, wherein the second bitstream is configured to cause the programmable logic to implement a second circuit design to perform a same processing operation as the first circuit design but at a faster rate.

EXAMPLE EMBODIMENT 9. The system of example embodiment 5, wherein the workload-dependent partial reconfiguration causes the integrated circuit to perform the first workload at a frequency different from that used to perform the first workload when not in the turbo processing mode.

EXAMPLE EMBODIMENT 10. The system of example embodiment 1, wherein the host device is configured to increase a power supplied to the integrated circuit when the integrated circuit enters the turbo processing mode.

EXAMPLE EMBODIMENT 11. A method comprising: sensing a first power value associated with programmable logic circuitry performing a first processing operation; determining a power headroom value based on a difference between a threshold power value and the first power value; and reconfiguring the programmable logic circuitry to perform the first processing operation faster in based on the power headroom value.

EXAMPLE EMBODIMENT 12. The method of example embodiment 11, comprising: implementing a custom logic function in a first region of configurable logic blocks (CLBs) of the programmable logic based on a first bitstream stored in configuration memory, wherein the custom logic function is associated with performing the first processing operation at a first clock frequency; wherein reconfiguring the programmable comprises: receiving a second bitstream; and writing the second bitstream to the configuration memory, wherein the first region of configurable logic blocks (CLBs) implement the custom logic function at a second clock frequency based on the second bitstream after the second bitstream is stored in the configuration memory to replace at least a portion of the first bitstream.

EXAMPLE EMBODIMENT 13. The method of example embodiment 12, wherein the first region of configurable logic blocks (CLBs) implement the custom logic function at the second clock frequency while a second region of configurable logic blocks (CLBs) implements another custom logic function at the first clock frequency.

EXAMPLE EMBODIMENT 14. The method of example embodiment 11, comprising: identifying that the first processing operation is completed; and in response to identifying that the first processing operation is completed, entering a deep sleep mode.

EXAMPLE EMBODIMENT 15. A device comprising: configuration memory configured to store a first bitstream; programmable logic configured to perform a first operation based on the first bitstream; and control circuitry configured to: instruct the programmable logic to perform the first operation; while the programmable logic performs the first operation: receive a first power value corresponding to an amount of ongoing power consumption while performing the first operation; determine a power headroom value based on a difference between a threshold power value and the first power value; and in response to the power headroom value, enter a turbo processing mode to perform the first processing operation using a second bitstream stored in the configuration memory.

EXAMPLE EMBODIMENT 16. The device of example embodiment 15, wherein the first bitstream causes the programmable logic to perform the first operation in a first sector of the programmable logic and to perform a second operation in a second sector of the programmable logic, and wherein the programmable logic causes the first sector to enter the turbo processing mode without also causing the second sector to enter the turbo processing mode.

EXAMPLE EMBODIMENT 17. The device of example embodiment 16, wherein entering the turbo processing mode comprises loading the second bitstream configured to implement the same operation as the first bitstream but at a greater clock rate determined based on the power headroom value of the first sector.

EXAMPLE EMBODIMENT 18. The device of example embodiment 16, wherein the first sector comprises a first power headroom monitor configured to sense a power to generate the first power value, and wherein the second sector comprises a second power headroom monitor.

EXAMPLE EMBODIMENT 19. The device of example embodiment 18, wherein the first sector is configurable to operate in the turbo processing mode at a different time than the second sector operating in the turbo processing mode.

EXAMPLE EMBODIMENT 20. The device of example embodiment 18, wherein the first sector is configurable to operate in the turbo processing mode at a same time than the second sector operating in a deep sleep mode.

What is claimed is:

1. A system comprising:
    an integrated circuit comprising programmable logic configurable to perform a first workload and a monitoring circuit, wherein the integrated circuit is configurable to perform a processing operation based on a configuration memory configurable to store a first bitstream; and
    a host device configurable to:
        receive sensed data from the monitoring circuit while the integrated circuit performs the first workload;
        determine power headroom based on the sensed data; and
        determine to cause the integrated circuit to enter a turbo processing mode based on the power headroom.

2. The system of claim 1, wherein the host device is configurable to perform a workload-dependent partial reconfiguration of the integrated circuit based on the power headroom of the integrated circuit to perform the first workload in the turbo processing mode.

3. The system of claim 1, wherein the host device is configurable to:
    determine that the processing operation was completed by the integrated circuit while in the turbo processing mode; and
    instruct the integrated circuit to enter a deep sleep mode based on the processing operation being completed.

4. The system of claim 1, wherein the host device is configurable to determine the power headroom based on a difference between a first power consumption and a target power consumption.

5. The system of claim 1, wherein the integrated circuit is configurable to enter the turbo processing mode at least in part by:
    receiving a second bitstream; and writing the second bitstream to the configuration memory to enter the turbo processing mode.

6. The system of claim 1, wherein the first bitstream is configurable to cause the programmable logic to implement a first circuit design, wherein a second bitstream is configurable to cause the programmable logic to implement a second circuit design to perform a same processing operation as the first circuit design but at a faster rate.

7. The system of claim 1, wherein a workload-dependent partial reconfiguration causes the integrated circuit to perform the first workload at a frequency different from that used to perform the first workload when not in the turbo processing mode.

8. The system of claim 1, wherein the host device is configurable to increase a power supplied to the integrated circuit when the integrated circuit enters the turbo processing mode.

9. The system of claim 1, wherein the turbo processing mode comprises increasing a clock frequency of the integrated circuit while the integrated circuit is in the turbo processing mode.

10. The system of claim 5, wherein the second bitstream causes the programmable logic to implement a circuit design at a faster clocking frequency than the first bitstream causes the programmable logic to implement the circuit design.

11. A method comprising:
implementing a custom logic function in a first region of configurable logic blocks (CLBs) of programmable logic circuitry based on a first bitstream stored in configuration memory;
sensing a first power value associated with the programmable logic circuitry performing a first processing operation;
determining a power headroom value based on a difference between a threshold power value and the first power value; and
reconfiguring the programmable logic circuitry to perform the first processing operation faster based on the power headroom value.

12. The method of claim 11,
wherein the custom logic function is associated with performing the first processing operation at a first clock frequency;
wherein reconfiguring the programmable logic circuitry comprises:
receiving a second bitstream; and
writing the second bitstream to the configuration memory, wherein the first region of configurable logic blocks (CLBs) implement the custom logic function at a second clock frequency based on the second bitstream after the second bitstream is stored in the configuration memory to replace at least a portion of the first bitstream.

13. The method of claim 11, comprising:
identifying that the first processing operation is completed; and
in response to identifying that the first processing operation is completed, entering a deep sleep mode.

14. The method of claim 12, wherein the first region of configurable logic blocks (CLBs) implement the custom logic function at the second clock frequency while a second region of configurable logic blocks (CLBs) implements another custom logic function at the first clock frequency.

15. A device comprising:
configuration memory configurable to store a first bitstream;
programmable logic configurable to perform a first operation based on the first bitstream; and
control circuitry configurable to:
instruct the programmable logic to perform the first operation;
while the programmable logic performs the first operation:
receive a first power value corresponding to an amount of ongoing power consumption while performing the first operation;
determine a power headroom value based on a difference between a threshold power value and the first power value; and
in response to the power headroom value, enter a turbo processing mode to perform the first operation based on a faster clock frequency while in the turbo processing mode.

16. The device of claim 15, wherein the first bitstream causes the programmable logic to perform the first operation in a first sector of the programmable logic and to perform a second operation in a second sector of the programmable logic, and wherein the programmable logic causes the first sector to enter the turbo processing mode without also causing the second sector to enter the turbo processing mode.

17. The device of claim 16, wherein entering the turbo processing mode comprises loading a second bitstream configurable to implement the same operation as the first bitstream but at the faster clock frequency determined based on the power headroom value of the first sector.

18. The device of claim 16, wherein the first sector comprises a first power headroom monitor configurable to sense a power to generate the first power value, and wherein the second sector comprises a second power headroom monitor.

19. The device of claim 18, wherein the first sector is configurable to operate in the turbo processing mode at a different time than the second sector operating in the turbo processing mode.

20. The device of claim 18, wherein the first sector is configurable to operate in the turbo processing mode at a same time than the second sector operating in a deep sleep mode.

* * * * *